United States Patent [19]

Shimazaki et al.

[11] Patent Number: 4,534,439

[45] Date of Patent: Aug. 13, 1985

[54] PARKING LOCK DEVICE FOR MOTOR TRICYCLES

[75] Inventors: Taiichi Shimazaki; Masahico Takenaka, both of Saitama, Japan

[73] Assignee: Honda Giken Kogyo Kabushiki Kaisha, Tokyo, Japan

[21] Appl. No.: 411,078

[22] Filed: Aug. 24, 1982

[30] Foreign Application Priority Data

Aug. 27, 1981 [JP] Japan ................... 56-134498

[51] Int. Cl.³ .................... B62D 61/08; B62L 3/02
[52] U.S. Cl. ........................ 180/215; 70/228;
70/233; 188/24.18
[58] Field of Search ........... 180/215, 210; 280/282;
188/24.18, 265; 70/233, 236, 254, 252, 207, 192,
210, 211, 224, 228

[56] References Cited

U.S. PATENT DOCUMENTS 2,149,761  3/1939  Coats .................... 188/265 X
4,356,876  11/1982  Watanabe ................ 188/109 X

FOREIGN PATENT DOCUMENTS 351402  8/1937  Italy .................... 188/24.18

Primary Examiner—John A. Pekar
Attorney, Agent, or Firm—Sughrue, Mion, Zinn, Macpeak and Seas

[57] ABSTRACT

A Parking lock operating device for a motor tricycle is disclosed. The motor tricycle includes a front and rear bodies which are equipped with a single wheel and two wheels, respectively. The motor tricycle is also equipped with parking brake means for braking the movement of the tricycle when stopped and means for preventing the front body from rolling and swinging in parking. The parking lock operating device may effect both the parking brake means and the means for preventing roll and swing motions of the front body relative to the rear body by a single operation lever. In addition, for burglarproof of the tricycle, a key switch cannot be pulled apart unless the operating lever is rotated to a predetermined position after the operation lever is lifted up for parking lock.

7 Claims, 8 Drawing Figures

PARKING LOCK DEVICE FOR MOTOR TRICYCLES

BACKGROUND OF THE INVENTION

The present invention relates to a parking lock device for a motor tricycle of the rocking type.

There is known a rocking type tricycle having one front wheel and two rear wheels, in which a prime mover is mounted. A front body of the tricycle can move both vertically and transversely with respect to a rear body thereof.

Where the tricycle thus constructed is parked, it is necessary to effect both a braking lock by means of a parking brake, to prevent the tricycle from rolling and, an interlock of the front body with respect to the rear body to prevent any vertical or transverse movements of the front body relative to the rear body. These respective locking operations are preferably performed by the single parking lock operation. A device which can simultaneously effect the two parking locks by the single operation is known.

Now, in a device for effecting such parking locks, it is necessary to prevent the locking operations from being forgotten. Moreover, to help prevent theft, once the parking locks are performed, the easy release by a person other than the owner or rider of the tricycle from the locked state is not desired.

To meet the above described desires the present invention provides as an object a parking lock device in which a main switch for starting and stopping the tricycle engine cannot be pulled apart disengaged, unless the parking locks are engaged, to thereby prevent the locking operations from being forgotten and the vehicle from being stolen.

SUMMARY OF THE INVENTION

An object of the invention is to provide, in a motor tricycle having front and rear bodies and a steering portion including a steering handle, the front or rear body being equipped with one wheel, the other being equipped with two wheels which are adapted to be driven by a prime mover, either of the front or rear body, capable of being rocked vertically and transversely relative to the other, an improved parking lock operating device in which a parking lock operation lever for effecting a parking braking operation and at least the locking of the front body against transverse movement relative to the back body is arranged in the vicinity of the steering portion of the body.

Another object of the invention is to provide a parking lock device for a small-sized vehicle, having brake lock means for braking a movement of said vehicle, and key switch means for starting and stopping an engine, the parking lock device comprising parking operation lever means for actuating at least the brake lock means, the key switch means including a lock position mode where a key is allowed to be inserted into or pulled apart from the key switch means, and an engagement member which is operative in the lock position mode cooperating with the parking operation lever means to thereby hold the operation lever means in a parking position.

BRIEF DESCRIPTION OF THE DRAWINGS

In the accompanying drawings showing the embodiment of the present invention.

DESCRIPTION OF THE PREFERRED EMBODIMENTS

The present invention will now be described in detail in connection with one preferred embodiment thereof with reference to the accompanying drawings. Incidentally, the description and the embodiment are directed to a motor tricycle, but the present invention can also be applied to a motorcycle.

Figure 1:
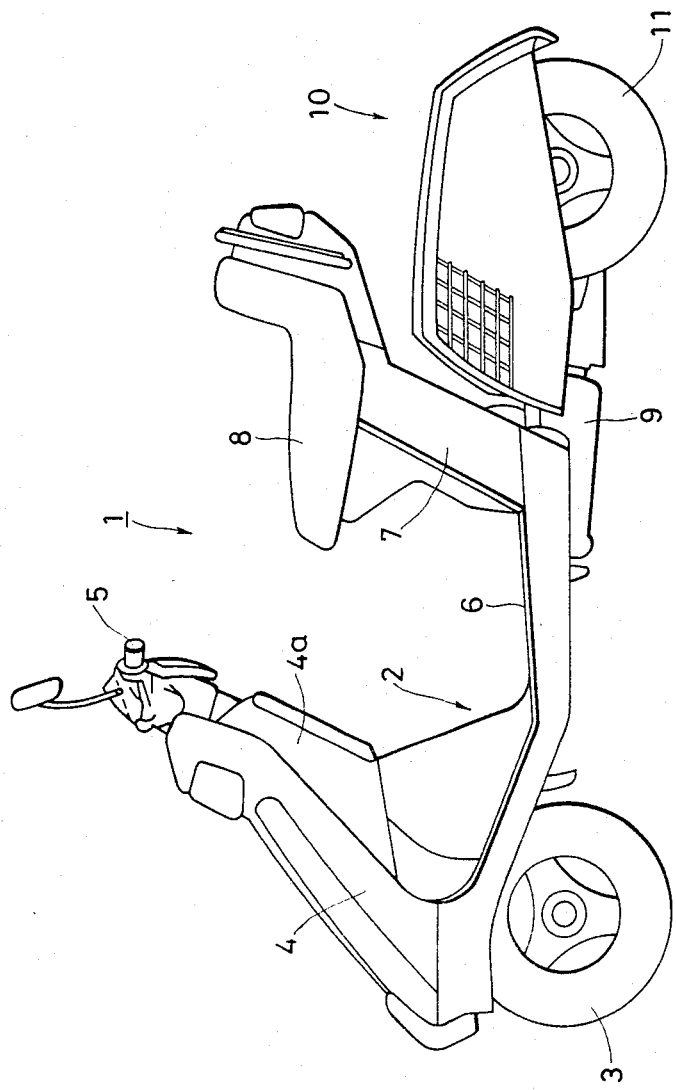
FIG. 1 is a side elevation showing a motor tricycle exemplifying a small-sized vehicle.
Figure 2:
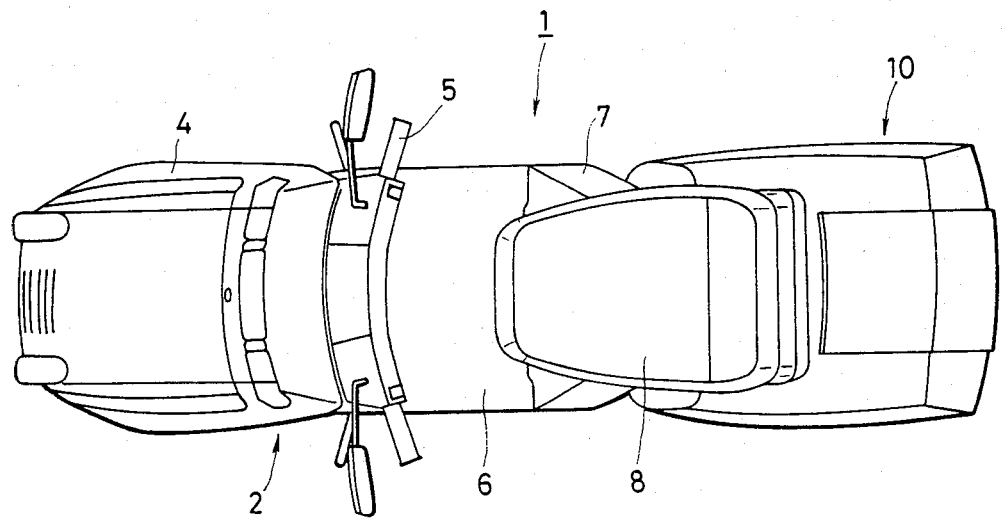
FIG. 2 is a top plan view of the same.

FIGS. 1 and 2 are a side elevational view and a plan view showing a tricycle, respectively. A tricycle 1 is constructed of a front body 2 and a rear body 10. Below the foremost portion of the front body 2, there is provided a single front wheel 3 which acts as a steering wheel. A leg shield 4 having at an upper end a steering handle 5 is formed at the foremost portion of the front body. The front body 2 has in the middle portion a low level flat floor 6. On the rear portion of the floor 6, rises a seat post 7 which is provided at its upper end with a seat 8.

At the rear lower portion of the front body 2 is disposed a joint 9 which is connected to a front lower portion of the rear body 10. The rear body 10 is coupled through the joint 9 in a vertically rocking manner (in swinging motions) to the front body 2 whereas this front body 2 is also coupled in a transversely rocking manner (in rolling motions) to the rear body 10. This rear body 10 is driven by a power unit (not shown) mounted thereon and is equipped with two rear wheels 11 which are directly driven by the power unit. The power unit and the upper halves of the rear wheels 11 are concealed by a cover which forms a part of the rear body.

Figure 3:
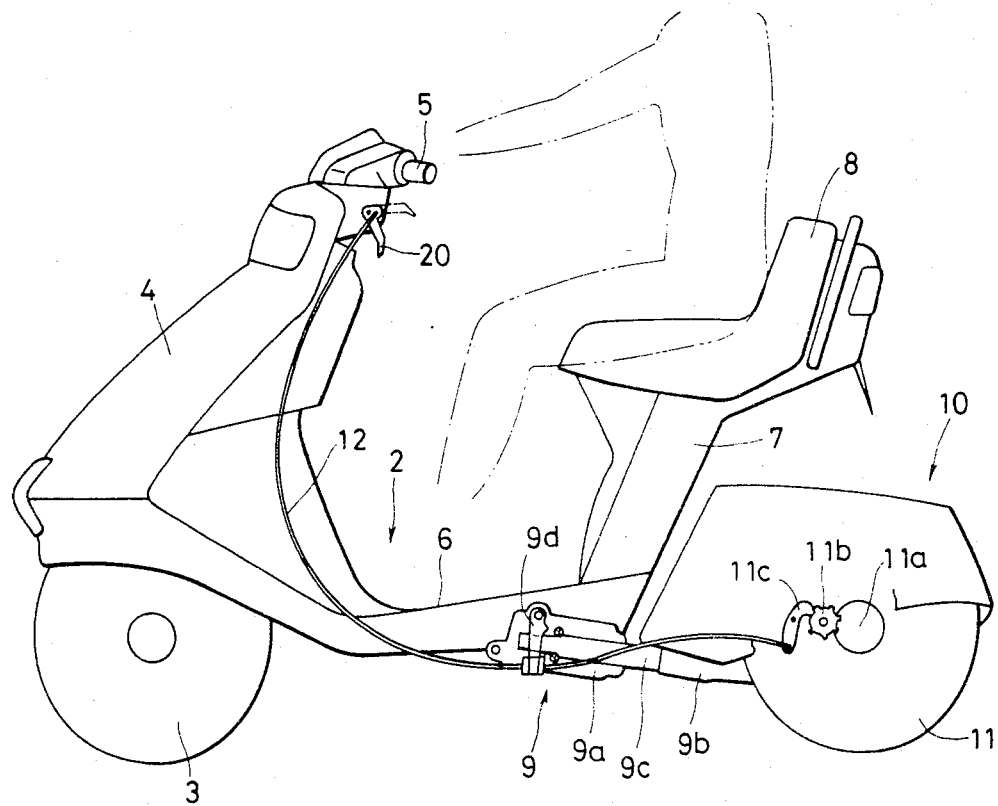
FIG. 3 is an explanatory view showing the locking system.

As shown in FIG. 3, locking cable 12 extends downwardly from the front upper portion of the front body 2 of the tricycle 1. The locking cable 12 further extends below the floor 6 and through the joint 9 to the rear wheels 11. The cable 12 is connected to a locking pawl mechanism 9d which is made operative by the pulling operation of the cable to lock a shaft 9c coupling a front portion 9a and a rear portion 9b of the joint 9 to each other. Further, the cable 12 is connected to a locking pawl 11c which is made operative to lock a locking gear 11b meshing with the axle 11a of the rear wheels 11. The cable 12 actuates the pawls 9d and 11c, when it is pulled, to effect the rocking lock and the braking lock.

Figure 4:
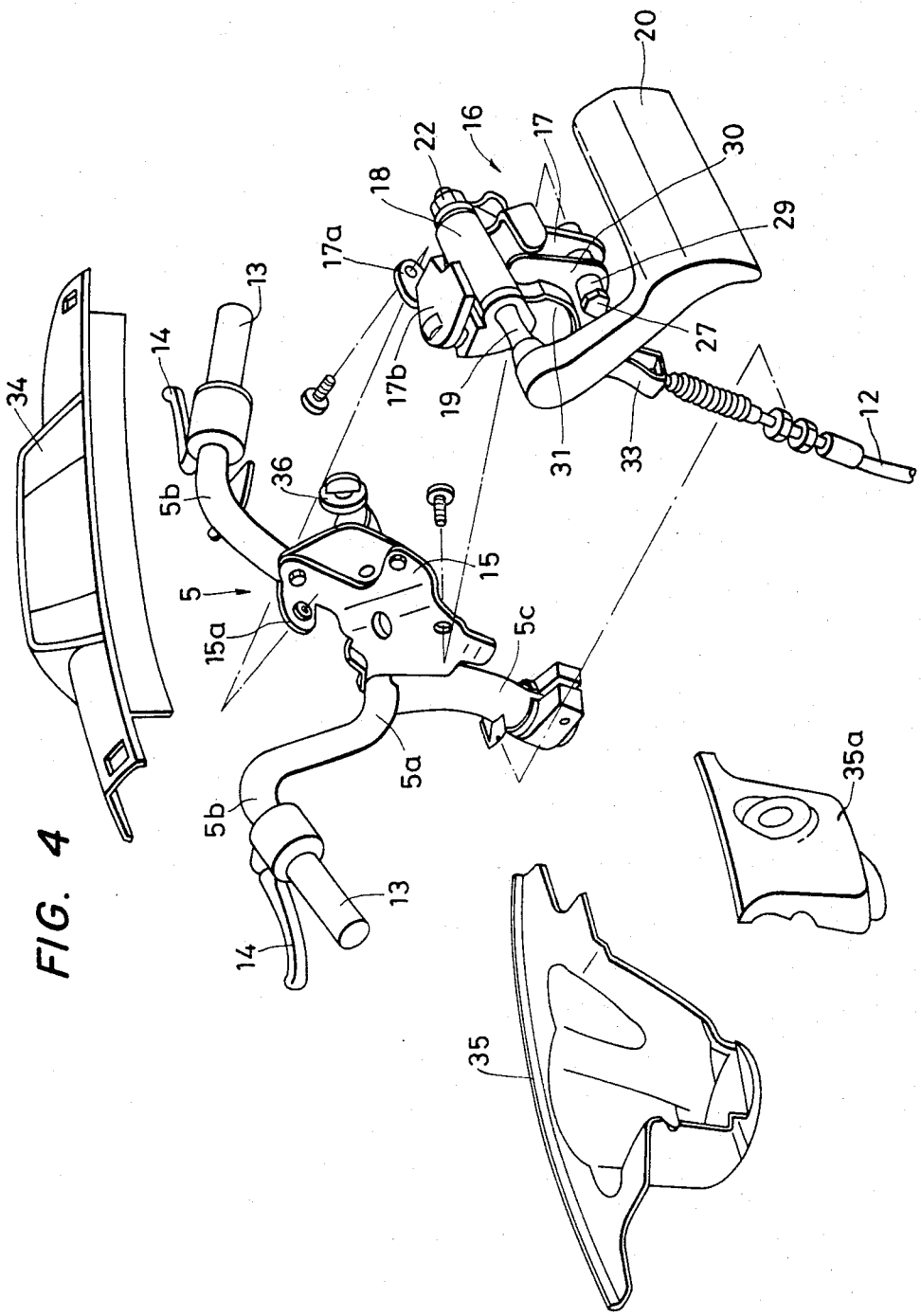
FIG. 4 is an exploded perspective view showing the handle portion.
Figure 5:
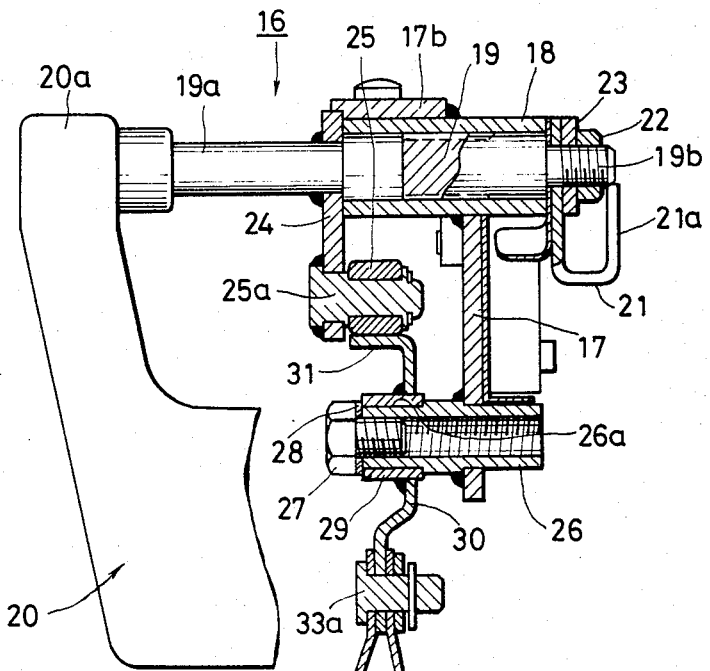
FIG. 5 is a longitudinal sectional front elevation showing the operation mechanism.
Figure 6:
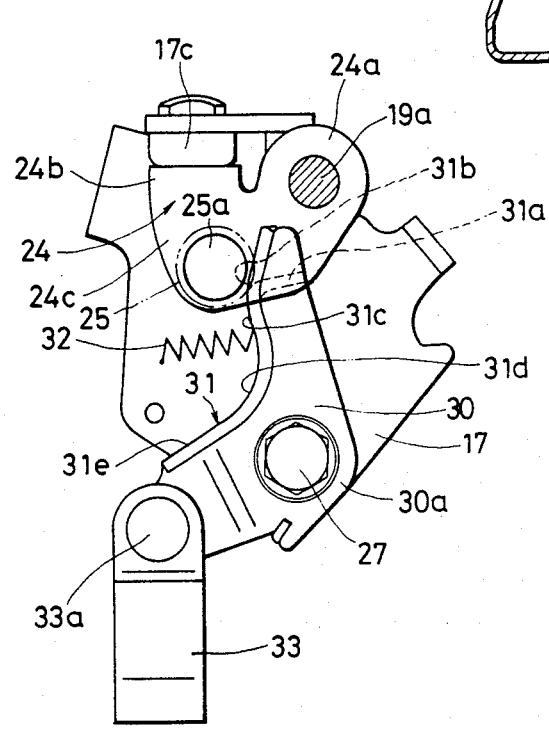
FIG. 6 is a side elevation of the same.

The parking lock device is shown in detail in FIGS. 4 to 6 and is attached to the handle 5 which protrudes upwardly from a handle column cover 4a disposed at the back of the leg shield 4. The handle 5 is made of a pipe which has its middle portion 5a bent in the form of a U-shape and its right and left ends 5b. The handle grips 13 are attached to the respective outer ends 5b.

Figure 8:
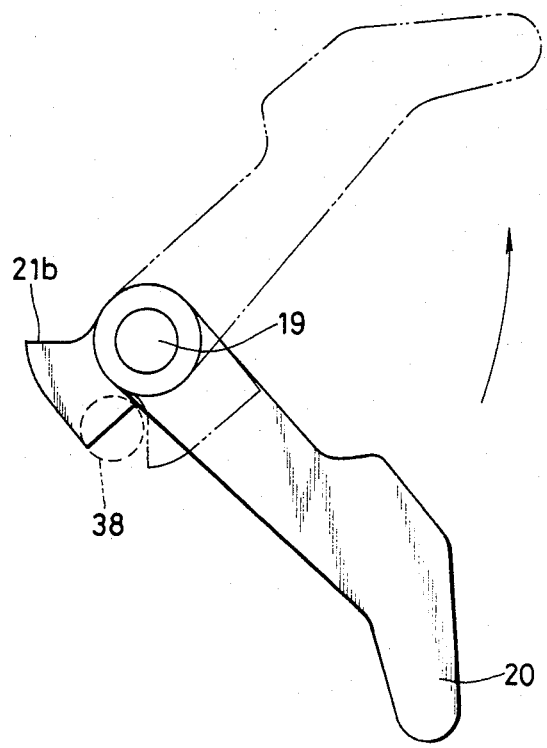
FIG. 8 is an explanatory view showing the operation of the lever.

For example, one grip 13 is used as an accelerator grip with clutch lever 14 and the other is provided with brake lever 14 in a conventional manner. From the center portion 5a of the handle 5, there is suspended a stem 5c which is connected to a steering shaft (not shown). To the middle portion 5a of the handle 5, there is fixed a bracket 15 which is press-molded of a plate material and to which the base member 17 of an operation mechanism 16 is fixed in an upright position. A bent flange portion 17a of the base member is fastened to the flanged portion 15a formed in the bracket 15 by, for example, screws. A middle portion of a sleeve 18 is fixed to the upper portion of the base member 17 in a horizontal position. An operation shaft 19 is rotatably inserted into the sleeve 18. The shaft 19 extends from one end of the sleeve 18 to form an extending portion 19a to which an end portion 20a of an L-shaped operation lever 20 is fixed. The other end portion of the shaft 19 extends through the opposite end of the sleeve 18 to form a threaded portion 19b to which the base portion of a lock plate 21, as shown in side elevation in FIG. 8, is fixed and on which a nut 22 and a spacer 23 are fitted and screwed to effect the axial regulation of the shaft 19 and the fixture of the lock plate 21 so that the lock plate 21 can rotate integrally with the shaft 19. An upper portion of an arm 24 which also acts as a member for the axial regulation of the shaft 19 is fixed to the base portion of the extending portion 19a of the shaft 19. The arm 24 has generally a U-shape as shown in FIG. 6 and has its one end 24a fixed to the extending portion 19a and its other end 24b positioned in a face-to-face relation with a cushion rubber 17c mounted on the lower side of a bent member 17b fixed to the upper end of the base member 17.

A pin 25a on which a roller 25 is rotatably supported is fixed to a lower middle portion 24c of the arm 24. A support hollow post 26, for example, a laterally elongated threaded hollow member in the embodiment is fixed to a lower portion of the base member 17. On the tapered portion 26a formed close to the end portion of the support post 26, there is rotatably fitted a collar 29 which has its axial position regulated by both a nut 27 screwed on said end portion of the support post 26 and a washer 28. To the collar 29, there is fixed the bent center point 30a of a cooperating arm 30 which has its side formed into an inverted "L" shape. The arm 30 has its front end bent to form a guide flange 31 having an inverted L-shape. The guide flange 31 has its upper portion 31a bent backwardly to have its front end portion 31b curved with a small curvature to come into close contact with the aforementioned roller 25 in a facing relationship. Below the front end portion 31b, the guide flange 31 is formed with a flat guide face 31c, a middle portion 31d curved in a concave shape, and a lower flat portion 31e. The arm 30 is biased in a returning direction, i.e., in the counterclockwise direction by the action of a spring 32 interposed between the guide flange 31 and the base member 17. To the lower end of the arm 30, there is hinged by a pin 33a a cable retaining member 33 to which the inner end of the cable 12 is connected.

The operation mechanism 16 fixed to the bracket 15 is covered, as shown in FIG. 4, with an upper handle cover 34, a front lower handle cover 35 and a rear lower handle cover 35a, when all of these covers 34, 35 and 35a are assembled and attached to the handle 5, while leaving the operating lever 20 exposed to the outside.

Figure 7:
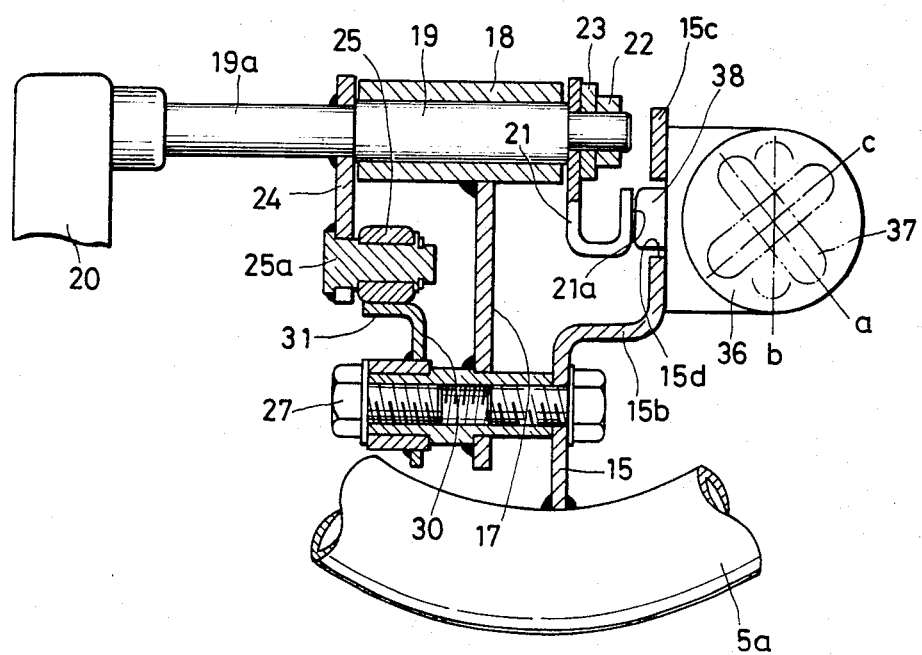
FIG. 7 is a longitudinally sectional front elevation showing another portion of the operation mechanism.

The bracket 15, which is fixed to rise from the middle portion of the handle 5, is partially formed with a transversely outwardly bent portion 15b (FIG. 7). To a supporting portion 15c which is formed to rise at an outward spacing from the bent portion 15b, there is fixed a main switch 36 which is made operative to start and stop the engine such that its key way 37 is directed backwardly to face the rider. The switch 36 is provided, as shown in FIG. 7, with an "OFF" position a, an "ON" position b which is turned counter-clockwise from the "OFF" position a, and a "lock" position c which is turned clockwise from the "OFF" position. In that "lock" position, the key can be inserted and removed only if a later-described lock pin 38 protrudes over the lock plate 21 of the lever 20. The supporting portion 15c is disposed in an externally spaced position but in face-to-face relation with the aforementioned lock plate 21. On the other hand, the switch 36 is equipped on the side of the supporting portion 15c with the lock pin 38 which is projectable/retractable and which is adapted to be urged toward the lock plate 21, when the key is in the "lock" position c by a built-in spring (not-shown). The lock pin 38 then protrudes from the hole 15d formed in the supporting portion 15c, so that the key can be inserted and removed from the key way 37 when the pin 38 is in its fully protruding state.

As described above, the lock pin 38 is in its retracted position, when the key way 37 of the switch 36 is in the "ON" position b or in the "OFF" position a. Under these conditions, even when it is desired to turn the key way 37 to the "lock" position c, the lock pin 38 abuts against the side member 21a of the lock plate 21 to prevent the turn of the key way while the lock pin 38 elastically protrudes. In this condition, the lever 20 is held in its lower position as shown in FIG. 8.

On the other hand, the operation shaft 19 is turned counter-clockwise in FIG. 6 or 8, by lifting up the lever 20. Then, the arm 24 is swung so that the cooperating arm 30 is swung clockwise in FIG. 6, about the collar 29 with its guide flange 31 being in contact with the roller 25. As a result, the member 33 is rocked about the pin 33a to pull the cable 12 to effect the aforementioned rocking (i.e., in the rolling motions) lock and the aforementioned braking lock. The roller 25 is brought to ride on the flat portion 31c of the guide flange 31 by the rocking motions of the arm so that it is stopped to pull the cable thereby to hold the locked state.

Integrally with the operation shaft 19, the lock plate 21 is rotated so that the lock pin 38 is released from its restraint to protrude to its full stroke, when the end edge 21b of the lock plate 21 terminates, whereby the end edge 21b engages with the pin 38 to block the reverse turn of the operation shaft 19, i.e., the turn in the lock releasing direction. As a result, even if the lever 20 is to be manually lowered, the locked state is maintained so that the rolling lock and the braking lock are not released. After the pin 38 protrudes to effect the locking operation of the operational lever 20, the key can be pulled apart from the key way 37.

By fitting the key in the key way 37 and by setting the same in the "OFF" position, the pin 38 is retracted to release the engagement with the end edge 21b. By slightly pushing the lever 20 downward, the roller 25 is shifted from the flat portion and is then returned by the action of the spring 32. The resultant shocks are absorbed by the rubber 17c.

As is apparent from the foregoing, according to the present invention, the parking lever is subjected to the locking operation and is brought into engagement with the engagement member of the main switch by setting the main switch in the "lock" position thereby to regulate its releasing motion. As a result, any person other than the rider cannot perform the lever releasing operation thereby to prevent the tricycle from being stolen. At the same time, the key can be pulled apart from the main switch only by setting the parking lever in its parking position so that the locking operation for parking purposes can be prevented from being forgotten. In addition, since the parking lever is provided at the front body, more preferably, at the steering handle, this leads to a space saving, resulting in facilitating riding on or off.

What is claimed is:

1. In a motor tricycle (1) having front and rear bodies (2, 10) a seat (8), a steering portion including a rotatable steering handle (5) said steering handle being located forward of said seat, and a key switch means (36) mounted on the rearward facing portion of said steering portion, the front or rear body being equipped with one wheel (3), the other being equipped with two wheels (11) which are adapted to be driven by a prime mover, and either of the front or rear body being enabled to rock vertically and roll transversely relative to the other, a parking lock operating device comprising a parking lock operation lever (20) for effecting a parking braking operation and at least a rolling locking operation attached to the rearward facing portion of said steering handle in close proximity to said key switch.

2. The parking lock operating device according to claim 1 wherein said key switch includes means for locking said parking lock operation lever in position to effect a parking braking operation and at least a rolling locking operation when said key switch is positioned to allow insertion or withdrawal of a key.

3. The parking lock operating device according to claim 1 wherein said key switch means includes a lock position mode (c) where a key is allowed to be inserted into or pulled apart from said key switch means, and an engagement member (38) which is operative in said lock position mode to cooperate with said parking lock operation lever to hold said parking lock operation lever in the parking position to effect parking braking operation and at least a rolling locking operation while allowing insertion or withdrawal of said key.

4. The parking lock operating device according to claim 1 wherein said key switch means includes a lock position mode (c) where a key is allowed to be inserted into or pulled apart from said key switch means, and an engagement member (38) which is operative in said lock position mode to cooperate with said parking lock operation lever to hold said parking lock operation lever in the parking position to effect a parking braking operation and at least a rolling locking operation, while allowing insertion or withdrawal of a key, said parking lock operating device further including; a bracket (15, 17) fixed to said steering handle, a rotary shaft (19) which is rotatably supported relative to said bracket and one end of which is fixed to said operation lever, a lock plate (21) fixed to the other end of said rotary shaft, and an arm (24) fixed to a middle portion of said rotary shaft, and means (30, 33, 12) for actuating a parking brake lock means and a rolling lock means, said actuating means being controllable to selectively actuate said parking brake lock means and said rolling lock means in response to movement of said arm (24), said engagement member (38) being biased toward said lock plate (21), wherein when said operation lever (20) is rotated in one direction said actuating means (30, 33, 12) is operative to actuate said parking brake lock means and said rolling lock means while at the same time, said lock plate is rotated to thereby move said engagement member (38) from its retracted position to its extended position allowing said key switch means to be positioned in its lock mode, whereby said key may be pulled apart from said key switch means (36).

5. A parking lock device for an engine powered, small-sized vehicle, having brake lock means (11a, 11b, 11c) for braking movement of said vehicle (1), and key switch means (36) for starting and stopping an engine powering said vehicle, said parking lock device comprising parking operation lever means for actuating at least said brake lock means when in a parking position, said key switch means including a lock position mode (c) where a key is allowed to be inserted into or pulled apart from said key switch means, and an engagement member (38) which is operative in said lock position mode to cooperate with said parking operation lever means to hold said operation lever means in the parking position while allowing insertion or withdrawal of said key.

6. A parking lock device for an engine powered, small-sized vehicle, having brake lock means (11a, 11b, 11c) for braking movement of said vehicle (1), and key switch means (36) for starting and stopping an engine powering said vehicle, said parking lock device comprising parking operation lever means for actuating at least said brake lock means when in a parking position, said key switch means includes a lock position mode (c) where a key is allowed to be inserted into or pulled apart from said key switch means, and an engagement member (38) which is operative in said lock position mode to cooperate with said parking operation lever means to hold said operation lever means in the parking position while allowing insertion or withdrawal of said key; wherein said operation lever means including an operation lever (20), a bracket (15,17) fixed to a steering handle of said vehicle, a rotary shaft (19) which is rotatably supported relative to said bracket and one end of which is fixed to said operation lever, a lock plate (21) fixed to the other end of said rotary shaft, and an arm (24) fixed to a middle portion of said rotary shaft, and means (30, 33, 12) for actuating said brake lock means (11a, 11b, 11c), said actuating means being controllable to selectively actuate said brake lock means in response to movement of said arm (24), said engagement member (38) being biased toward said lock plate (21), wherein when said operation lever (20) is rotated in one direction said actuating means (30, 33, 12) is operative to actuate said brake means (11a, 11b, 11c) while at the same time, said lock plate is rotated to thereby move said engagement member (38) from its retracted position to its extended position allowing said key switch means to be positioned in its lock mode, whereby said key may be pulled apart from said key switch means (36).

7. The parking device according to claim 6, further including a rubber roller (25) connected to said arm (24) and a spring (32), said spring urging said actuating means into contact with said rubber roller, said actuating means including an associated arm (30) having a continuous flange (31) in contact with said rubber roller, in which said operation lever (20) may be resiliently held at a lifted position by a form of said flange and a resilient force of said spring (32).

* * * * *